Jan. 29, 1946.  W. G. WERTS  2,393,849
SPREADER AND DUMP BOX
Filed Aug. 31, 1943   5 Sheets-Sheet 1

INVENTOR.
Walter G. Werts
BY
Bair & Freeman
Attys.

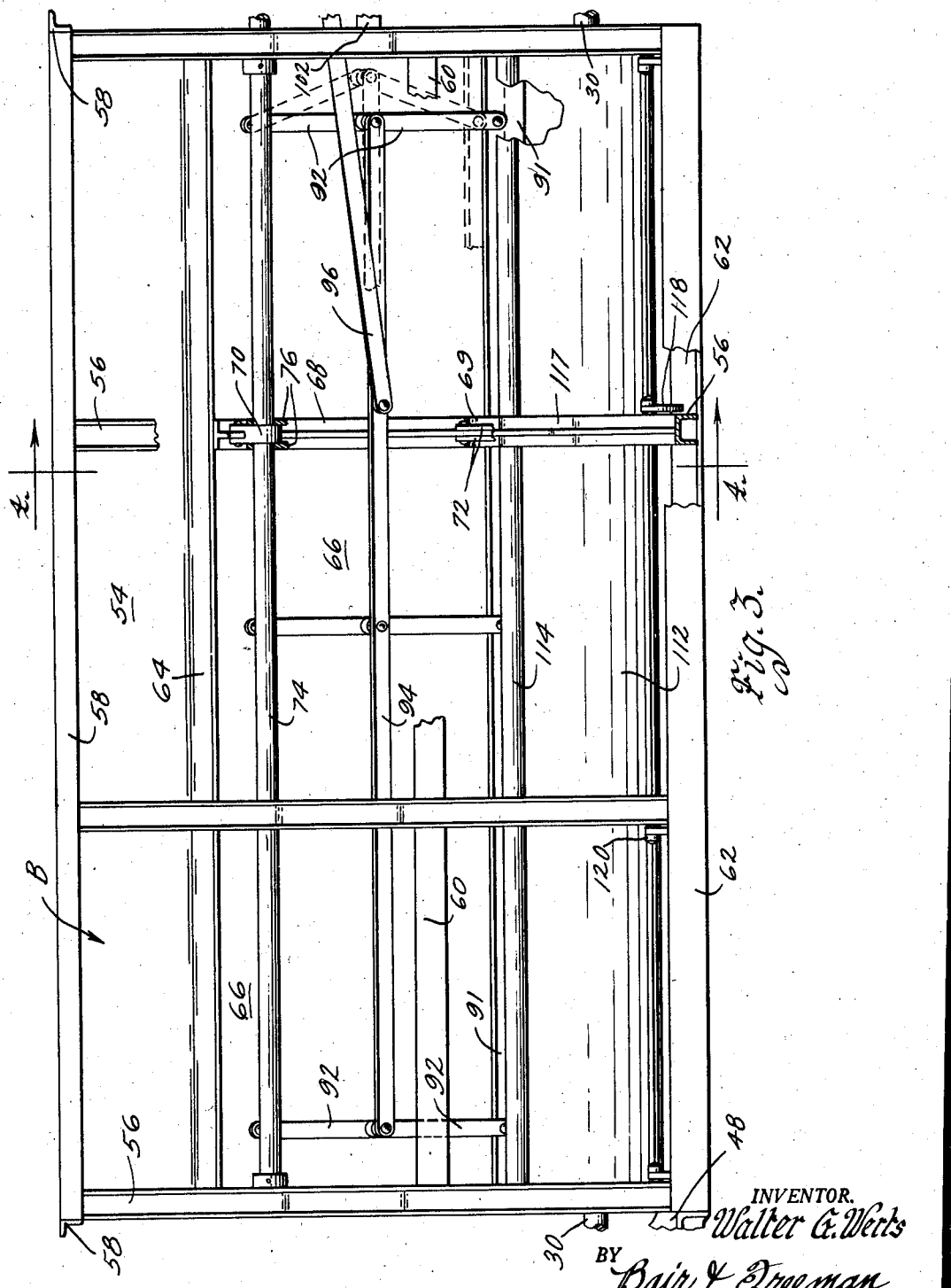

Jan. 29, 1946.  W. G. WERTS  2,393,849
SPREADER AND DUMP BOX
Filed Aug. 31, 1943   5 Sheets-Sheet 3
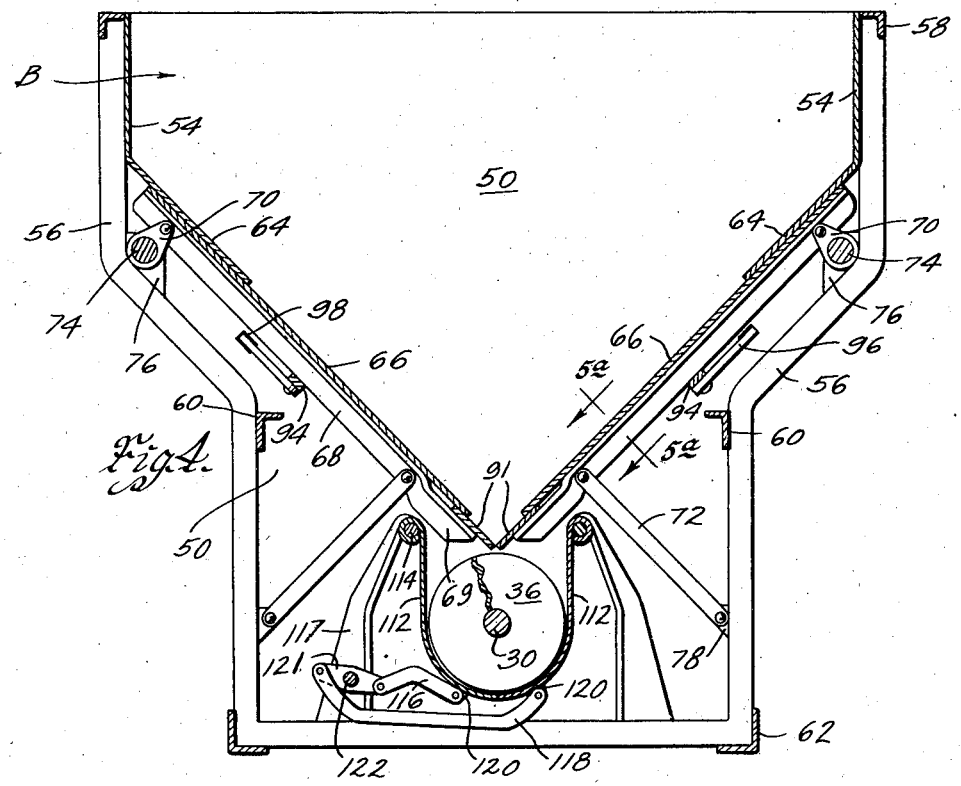
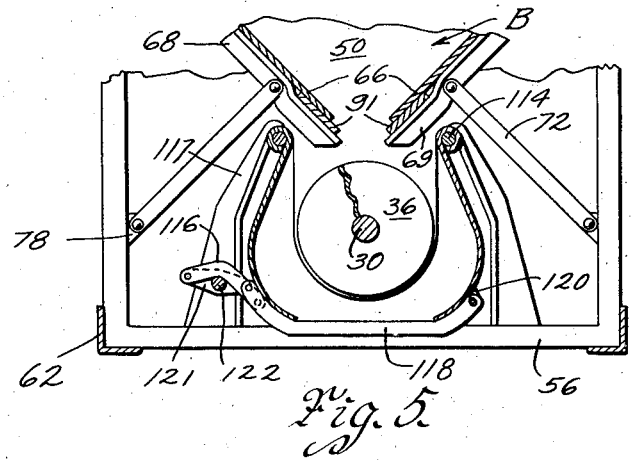
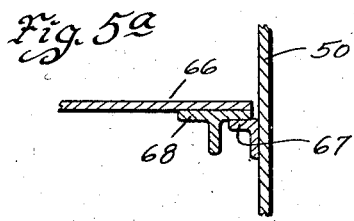
INVENTOR.
Walter G. Werts
BY Bair & Freeman
Attys.

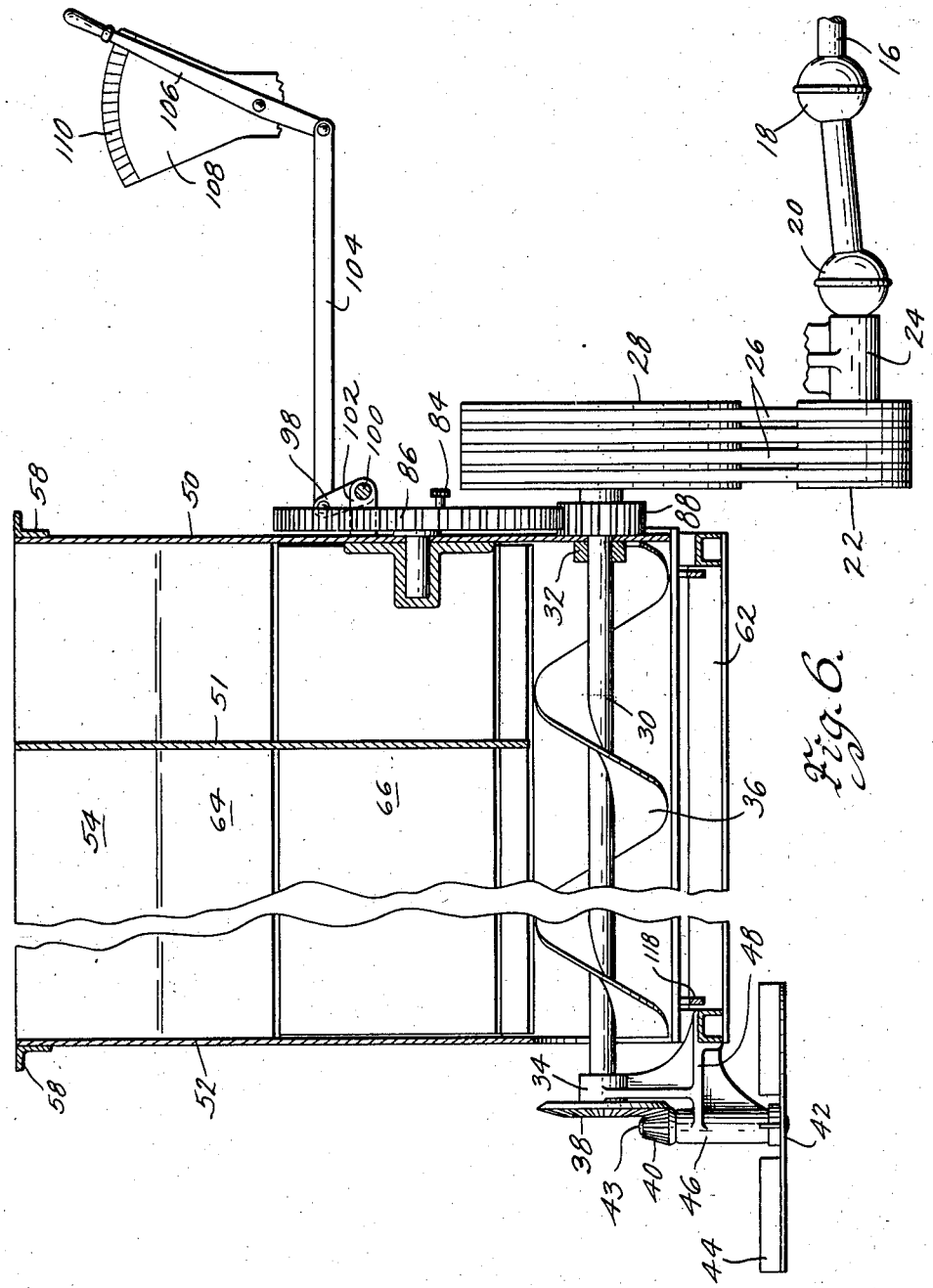

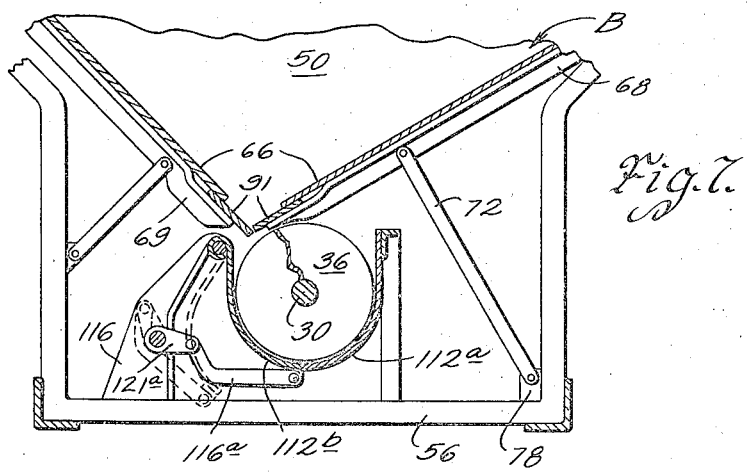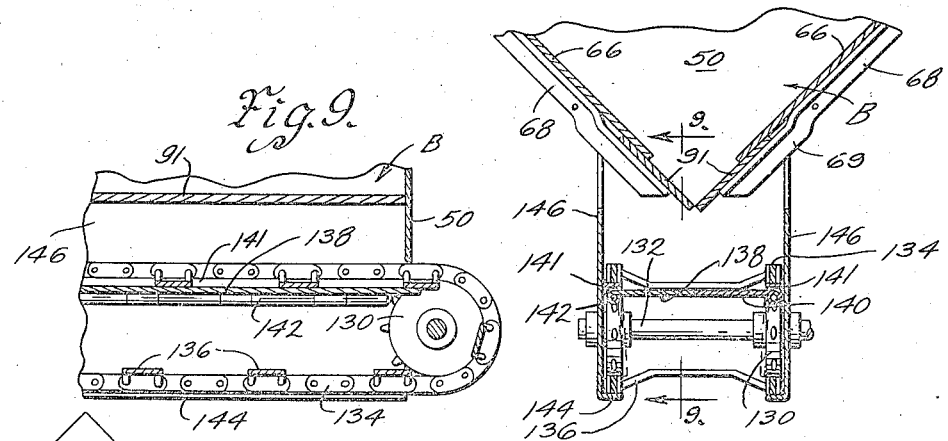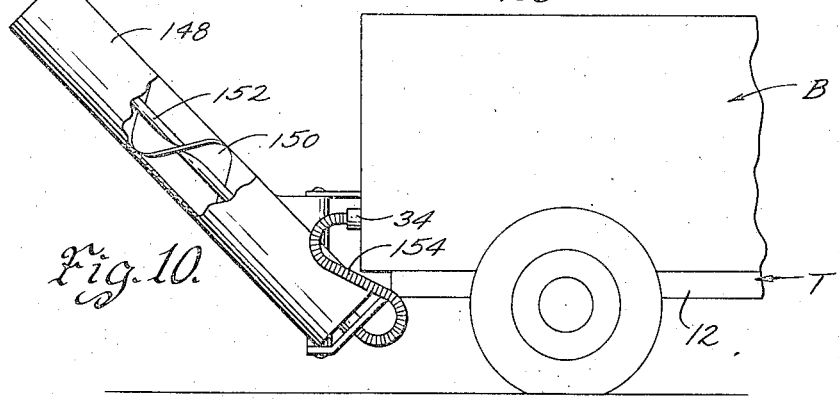

Patented Jan. 29, 1946

2,393,849

UNITED STATES PATENT OFFICE 2,393,849

SPREADER AND DUMP BOX

Walter Guy Werts, Bloomfield, Iowa

Application August 31, 1943, Serial No. 500,642

6 Claims. (Cl. 214—83)

My present invention relates to a spreader and dump box which may be mounted on a truck, trailer or the like and which is operable to either spread material such as fertilizer lime evenly over the ground surface as the box is transported thereover or in one position of adjustment to dump the contents of the box if desired.

One object of the invention is to provide a combined spreader and dump box having means therein to prevent the material from packing and to cause it to feed properly down to a spiral conveyor which conveys it to a spreading mechanism.

Another object is to provide a simple and effective means for adjusting the degree of feed from the box to the conveyor which may be operated as the box is being transported.

Still a further object is to provide a spiral conveyor having a conveyor trough which may be opened for permitting the material to pass downwardly through the conveyor without being conveyed thereby, the device thus being operated as a dump box instead of a spreader box.

Further objects are to provide modifications wherein only one side of the conveyor trough need be opened; wherein a slat type conveyor instead of a spiral conveyor is used, or wherein a swinging conveyor (instead of the spreader mechanism) may be substituted for piling or stacking material.

With these and other objects in view, my invention with respect to its features which I believe to be novel and patentable will be pointed out in the claims appended hereto. For a better detailed understanding of the invention, reference is made to the following description and to the accompanying drawings, wherein such further objects will definitely appear.

On the accompanying drawings,

Figure 3 is a side elevation of the box, omitting the gearing at the front and the spreading mechanism at the rear to conserve space on the drawings.

Figure 4 is a vertical sectional view on the line 4—4 on Figure 3 showing the parts of the box in spreader position.

Figure 5 is a similar sectional view showing the parts in dumping position.

Figure 5a is a detail sectional view on the line 5a—5a of Figure 4.

Figure 6 is a vertical sectional view on the line 6—6 of Figure 2 with the central portion of the box broken away, and showing the gearing and drive mechanism at the front of the box as well as the spreading mechanism at the rear thereof.

Figure 7 is a sectional view similar to Figure 4 showing a modified form of conveyor and feed control gates.

Figure 8 is a similar sectional view showing another modified form of conveyor.

Figure 9 is a longitudinal sectional view on the line 9—9 of Figure 8; and,

Figure 10 is a side elevation showing a modified structure for stock piling and the like.

Figure 2:
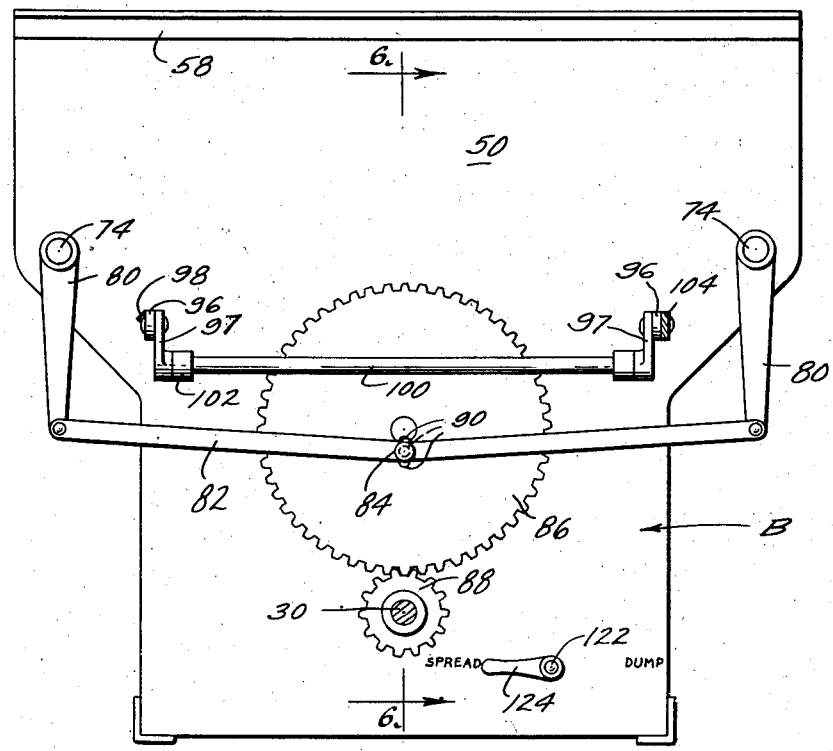
Figure 2 is an enlarged front elevation of the box showing certain operating mechanism thereof.

On the accompanying drawings I have used the reference character T to indicate generally a truck and B my combined spreader and dump box. The truck T has the usual cab 10 and chassis or frame 12. The box B is mounted on the chassis 12, and is operatively connected with the transmission 14 of the truck engine as shown in detail in Figure 6.

Truck transmissions usually have or may be provided with a power take-off shaft 16 to which I connect universal joints 18 and 20, and a multiple groove pulley 22. The shaft of the pulley 22 is journaled in a bearing or bracket 24 connected with the chassis 12 or with the frame of the box B if desired. The pulley 22 is connected by a series of V-belts 26 with a larger pulley 28. The pulley 28 is mounted on a conveyor shaft 30 journaled in bearings 32 and 34 at the front and rear ends respectively of the box B. The flight 36 of a spiral conveyor is mounted on the shaft 30.

At the rear end of the shaft, bevel gears 38 and 40 connect a spinner or broadcast-type spreader disc 42 with the shaft 30 whereby the disc is driven thereby. The disc 42 has the usual blades 44 for impinging the material that drops onto the disc from the rear end of the spiral conveyor 36 and throwing it by centrifugal force in all directions, thereby evenly spreading or distributing the material over the ground surface. A shaft 43 is provided for the bevel gear 40 and the disc 42 and it is journaled in a bearing 46. Both this bearing and the bearing 34 are part of a bracket 48.

The box B is hopper type, having a front wall 50, a rear wall 52, and a pair of side walls 54. These walls are supported by four frame members 56 made of suitable material such as channel iron and these may be braced with relation to each other as by angle bars 58, 60 and 62 connecting them together. The entire frame work and the walls 50, 52 and 54 may be welded with relation to each other whereby they are held in assembled relation. After fabrication, the box may be mounted on the truck chassis 12.

The bottom of the box is formed by a pair of extensions 64 inwardly and downwardly from the side walls 54 and bottom plates 66. The extensions 64 overlie the bottom plates 66. The bottom plates are mounted on T irons 68, one in alignment with each frame member 56. In Figure 3, the next to the right-hand frame member 56 has been broken away to show the T iron 68 at this point, and the others are like it. The front and rear marginal edges of the bottom plates 66 overlap angle bars 67 (see Figure 5a) to prevent leakage of material from the box B.

Each of the T irons 68 is supported adjacent its upper end by an arm 70 pivoted at its upper end thereto and, adjacent its lower end, supported by a pair of links 72 pivoted thereto. The arms 70 are bifurcated as shown in Figure 3 and mounted on a rock shaft 74. The rock shaft 74 is journaled in bearing plates 76, one for each shaft on each frame member 56. The lower ends of the link 72 are pivoted to bracket plates 78 attached as by welding to the frame members 56.

Referring to Figure 2, I show the means for rocking the shafts 74. This consists of an arm 80 on each rock shaft, a link 82 for each arm and a crank pin 84 traveling in a circle. This is accomplished by mounting the crank pin 84 off-center on a gear 86 which meshes with a pinion 88 on the conveyor shaft 30. A series of three openings 90 is provided so that the throw of the crank pin 84 can be adjusted. The arms 80, it will be noted, are quite long relative to the arms 70, and the crank pin 84 is rather close to the center of the gear 86 so that the rock arms 70 oscillate but slightly and in actual practice the movement need not be over one-half inch.

I provide an adjustable feed feature for the material in the box B when fed to the spiral conveyor 36. This is accomplished by extension plates or gates 91 (see Figure 4) confined in their movement between the lower ends of the plate 66 and opposite portions 69 of the T bars 68. These plates may be closed as in Figure 4 or opened as in Figure 5.

For closing and opening them, I provide toggle links 92 shown in Figure 3, pivoted at their upper ends to the plates 66 and at their lower ends to the gates 91. Intermediate their ends, they are pivoted to a tie bar 94 which may be moved to the full line position for closing the gates or to the dotted line position for opening them. Obviously the gates may be adjusted to various intermediate positions as desired or required.

For effecting this adjustment a link 96 extends forwardly from each tie bar 94 through a slot 98 in the front wall 50 of the box B and the links are twisted and connected with arms 97 of a rock shaft 100. The rock shaft 100 is journaled in bearings 102 and a link 104 is pivoted thereto and extends forwardly to an adjusting lever 106. This lever is preferably mounted in the cab 10 of the truck as by pivoting it to a bracket 108 and anchoring the bracket in any desired position. The bracket may be provided with indicating marks 110 to indicate to the operator the degree of opening of the gates 90 so that he can accurately adjust them for changing the degree of feed to the spreader as the ground is traversed and different portions of the ground require different amounts of fertilizer or other material being spread.

I provide a conveyor trough for the conveyor 36 in the form of a pair of sides 112 each hinged on a hinge rod 114. The hinge rods 114 are supported by brackets 117 and the sides are kept closed or opened as shown in Figures 4 or 5 respectively by a lever and link arrangement. The links are indicated at 116 and 118. Each has one end pivoted to a bracket 120 of the conveyor side 112 and its other end pivoted to a rock lever 121. The levers 121 are connected to a rock shaft 122 pivoted in the brackets 117. The rock shaft 122 extends through the front wall 50 as shown in Figure 2 and has thereon a handle 124 whereby the rock shaft may be adjusted to either a "spread" or "dump" position.

Figure 1:
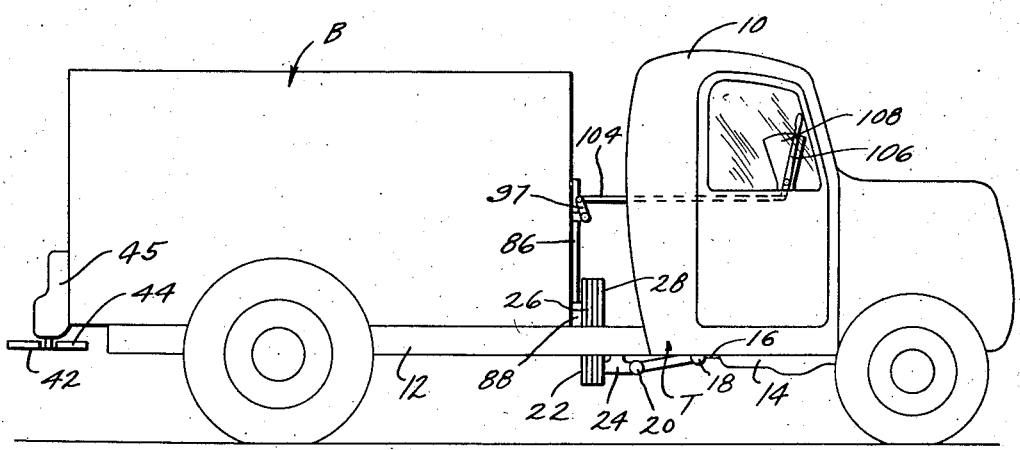
Figure 1 is a general diagrammatic view showing my combined spreader and dump box mounted on a standard truck.

Throughout the various figures of the drawings except Figure 1 (wherein a gear housing 45 is shown), I have omitted showing housings for the various gears. Such housings, however, would be provided so that the working parts can be enclosed and operate in an oil or grease bath.

In Figure 7 I show a modified construction wherein the feed control gates 91 are located adjacent the side of the spiral conveyor 36. This permits of a lower center of gravity for the spreader box, and by feeding at one side of the conveyor eliminates the possibility of an inexperienced operator choking the conveyor by over-opening the feed control gates. With the arrangement shown in Figure 7, the material cannot feed into the conveyor at a higher level than the screw will handle.

This arrangement also permits simplification of the dumping arrangement as one side of the conveyor trough shown at 112a may be stationary, and the remaining side 112b only need be hinged. By then using a single link 116a and a single arm 121a, the conveyor trough may be closed as shown in solid lines or opened as shown in dotted lines. When in open position, the material falls past the spiral conveyor in a somewhat easier manner than it falls through the conveyor in Figure 5.

My feed control gate arrangement and the combined spreading and dumping feature may also be applied to a slat type conveyor as shown in Figures 8 and 9. In these figures, instead of a spiral conveyor, sprockets 130 may be mounted on shafts 132 at the front and rear of the box B. Conveyor chains 134 are trained around the sprockets. Spaced slats 136 connect the chains 134 together and slide along bottom plates 138 and 140. These plates are hinged as at 142 so that they may be swung downwardly to the dotted position shown in Figure 8 when it is desirable to use the device as a box for dumping rather than spreading. The chains 136 are supported along their upper stretches by angle bars 142 and along their lower stretches by flanges 144. The flanges 144 are formed on side walls 146 of the conveyor.

In Figure 10 I show an attachment in the form of an auxiliary conveyor 148 substituted for the broadcast spinner 42. This conveyor also may be of spiral type, the spiral flight being shown at 150 and the shaft at 152. The shaft may be driven by any suitable means and by way of illustration I show a flexible shaft 154 connecting it with the main conveyor shaft 30. The conveyor 148 is preferably adjustable so that it can be used for stock piling of material such as road surfacing stone and the like. It is also advantageous in the placing of stoker coal in basements and for various other uses.

From the foregoing description it is believed obvious that I have provided a box for transporting material which has mechanism that permits it to be used either as a spreader box or a dump box. The device may be mounted on a standard truck, or on a trailer or other vehicle and provided with a built-in power unit. The spiral conveyor 36 is a comparatively trouble-free type of conveyor and operates at a low speed so that it has a relatively long life.

The spiral conveyor also serves to mix different materials when partitions such as shown at 51 in Figure 6 are placed in the box so that different materials may be loaded into the different compartments. The proportioning of the materials to be mixed by the conveyor is adjusted by the position of the partition. By the time the materials reach the spinner 42 they are thoroughly intermixed for even distribution.

As the truck advances across the ground, the operator may control the feed by manipulating the handle 106 and secure any degree of distribution within the range of the mechanism. The oscillating bottom plates 66 give a slow rolling motion to the material so as to break it up. This is especially necessary where the material is pulverized and has a tendency to become packed as when it is jolted down from a long haul. The rolling motion referred to results from the plates being arranged to form a trough and moving simultaneously toward the right or the left. The oscillating plates 66 effect proper feed of the material without the necessity of an extra man to poke the material down into the conveyor and because of the simultaneous movement referred to the gap between the lower edges of the gates remains substantially uniform for any given setting.

The control gates 91 when carried by the oscillating plates 66 may be readily adjusted for controlling the degree of feed without interference with the oscillations of the bottom plates. These oscillations produce a uniform feed of the material into the conveyor for transfer to the spinner 42, or when the conveyor trough is opened they facilitate the dumping of the material in a single pile.

Since the motion of the mechanism except the spinner disc is relatively slow, not much power is necessary to operate the spreader, and long wearing of the parts is assured.

My box can be used to either spread, dump or pile material, and is operable in connection with any crushed or pulverized material. It may be used to spread agricultural stone, phosphate, lime, or other soil builder, and by using the partition 51, two or more materials may be mixed during distribution. In connection with highways, streets, and airports it is useful for spreading cinders, sand or calcium chloride to eliminate hazards in connection with iced or other slippery surfaces.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a device of the class described, a box having a discharge opening, a plurality of feed gates for regulation of the discharge of material from said box, a conveyor for transferring the material, said conveyor having a discharge portion at the rear end thereof and means for opening the entire bottom of said conveyor to permit the material to be dropped directly throughout the length of the conveyor without being conveyed thereby to said discharge portion.

2. Mechanism for the spreading of material comprising a container, a conveyor for transferring material from said container, said conveyor having a movable bottom, means for feeding the material from said container to said conveyor and means for moving said bottom to a position where it cannot support the material for conveyance by said conveyor for thereby dumping the contents of said container directly through the conveyor.

3. A device of the class described comprising a hopper having a bottom, means for supporting said bottom for oscillation, a feed regulating gate constituting a continuation of said bottom and carried thereby, and lever means connected with said gate and with said bottom for adjusting said gate, said lever means being carried by said bottom and oscillatable therewith.

4. A material handling machine having means for discharging carried materials, said machine being provided with load carrying plates arranged to form a trough, said plates being oscillatable to assist in the discharge of the materials, and means to oscillate said plates simultaneously and alternately to the right and left to impart a rolling action to the body of materials.

5. A material handling machine having means for utilizing carried materials, said machine having a pair of load carrying plates arranged trough-like at substantially right angles to each other, said plates being movable in substantially their planes to facilitate the movement of the materials to said utilizing means, and means to alternately move both of said plates toward the right and then the left a short distance.

6. A material handling machine for spreading and dumping material comprising a hopper having substantially flat and inclined oscillating parts to loosen the material handled, said parts being arranged trough-like with their lower edges adjacent each other and defining a discharge slot a conveyor for receiving the material, and power means for operating said conveyor and oscillating said parts, moving them simultaneously substantially the same distance to the right and then to the left to roll the materials on said inclined parts first in one direction and then the other and retain said discharge slot at substantially the same width in all positions of oscillation.

WALTER GUY WERTS.